(12) United States Patent
Barnes

(10) Patent No.: US 11,047,513 B2
(45) Date of Patent: Jun. 29, 2021

(54) JOINING LINED PIPE SECTIONS

(71) Applicant: Pioneer Lining Technology Limited, Clydebank (GB)

(72) Inventor: Stephen Barnes, Glasgow (GB)

(73) Assignee: Pioneer Lining Technology Limited, Clydebank (GB)

(*) Notice: Subject to any disclaimer, the term of this patent is extended or adjusted under 35 U.S.C. 154(b) by 178 days.

(21) Appl. No.: 15/575,812

(22) PCT Filed: May 23, 2016

(86) PCT No.: PCT/GB2016/051477
§ 371 (c)(1),
(2) Date: Nov. 20, 2017

(87) PCT Pub. No.: WO2016/185228
PCT Pub. Date: Nov. 24, 2016

(65) Prior Publication Data
US 2018/0119850 A1    May 3, 2018

(30) Foreign Application Priority Data
May 21, 2015 (GB) ...................................... 1508718

(51) Int. Cl.
*F16L 13/02* (2006.01)
*F16L 1/18* (2006.01)
(Continued)

(52) U.S. Cl.
CPC ............ *F16L 13/0263* (2013.01); *F16L 1/18* (2013.01); *F16L 13/0272* (2013.01); *F16L 58/181* (2013.01); *F16L 59/20* (2013.01)

(58) Field of Classification Search
CPC ..... F16L 13/0263; F16L 13/0272; F16L 1/18; F16L 58/181; F16L 59/20
See application file for complete search history.

(56) References Cited

U.S. PATENT DOCUMENTS 3,890,483 A * 6/1975 Webster ............... B23K 9/0026
219/92
5,282,652 A * 2/1994 Werner ................. F16L 58/182
277/607
(Continued)

FOREIGN PATENT DOCUMENTS

CA        2 756 825       11/2002
CN        101482213        7/2009
(Continued)

*Primary Examiner* — Benjamin F Fiorello
*Assistant Examiner* — Stacy N Lawson
(74) *Attorney, Agent, or Firm* — Levy & Grandinetti

(57) ABSTRACT

In order to reduce or remove the potential risk of heat damage in the absence of cooling jackets when joining lined pipe sections, each lined pipe section is provided with an insulatory sleeve which is disposed between the host pipe and the respective liner. The sleeves provide discrete thermal protection to the ends of the liners and, where applicable, electrofusion welds between an electrofusion fitting and the liners. The sleeves are first located in the ends of the host pipes which are then lined by drawing the liners through the host pipes via a reduction die to reduce their external diameter. The liners are then reverted towards their original dimensions resulting in a tight fitting against the internal surface of the host pipes and of the insulatory sleeves thereby compressing the insulation material.

27 Claims, 2 Drawing Sheets

(51) Int. Cl.
*F16L 59/20* (2006.01)
*F16L 58/18* (2006.01)

(56) References Cited

U.S. PATENT DOCUMENTS

| | | | |
|---|---|---|---|
| 5,634,672 A | 6/1997 | Stack et al. | |
| 5,900,195 A * | 5/1999 | Pool | B29C 44/1242 264/46.5 |
| 5,992,897 A | 11/1999 | Hill et al. | |
| 6,226,855 B1 * | 5/2001 | Maine | F16L 13/0263 228/44.5 |
| 2006/0210361 A1 * | 9/2006 | Lamison | F16L 1/161 405/168.3 |
| 2010/0028085 A1 * | 2/2010 | Rocher | F16L 1/161 405/169 |
| 2010/0171301 A1 | 7/2010 | Tierling | |
| 2010/0207380 A1 | 8/2010 | Venable et al. | |
| 2010/0266790 A1 * | 10/2010 | Kusinski | B32B 1/08 428/34.6 |
| 2011/0193339 A1 * | 8/2011 | Kenworthy | B29C 65/344 285/21.2 |
| 2012/0142240 A1 * | 6/2012 | Eling | C08G 18/36 442/59 |
| 2013/0114945 A1 * | 5/2013 | Pionetti | F16L 1/15 392/472 |
| 2013/0284962 A1 * | 10/2013 | Gledhill | F16J 15/025 251/148 |
| 2013/0292936 A1 * | 11/2013 | Rosen | F16L 13/0236 285/53 |
| 2014/0035186 A1 * | 2/2014 | Recher | C08G 61/08 264/162 |
| 2014/0103638 A1 * | 4/2014 | Compton | F16L 13/0263 285/55 |
| 2014/0306445 A1 * | 10/2014 | Boyd | F16L 13/0272 285/55 |

FOREIGN PATENT DOCUMENTS

| | | | |
|---|---|---|---|
| CN | 201306535 | 9/2009 | |
| CN | 203571248 | 4/2014 | |
| DE | 102010052212 | 5/2012 | |
| EP | 0 220 122 | 4/1987 | |
| EP | 0220122 A1 * | 4/1987 | .......... F16L 13/0272 |
| GB | 1 480 061 | 7/1977 | |
| GB | 2 391 597 | 2/2004 | |
| WO | WO 95/22713 | 8/1995 | |
| WO | WO 2010/041016 | 4/2010 | |
| WO | WO 2011/045567 | 4/2011 | |

\* cited by examiner

JOINING LINED PIPE SECTIONS

The present invention relates to methods of joining lined pipe sections. More specifically, the present invention concerns improvements to methods of joining lined pipe sections which reduces the risk of damage to the liners from the heat generated when the ends of lined pipe sections are welded together.

BACKGROUND TO THE INVENTION

The life and performance of new and existing pipelines can be extended and optimised by lining lengths of metal pipe with polymer liners. Techniques such as the Applicant's Swagelining® pipe lining service allows existing pipelines to be remediated and new pipelines to be provided with corrosion resistance by installing a polymer liner that remains in tight contact with the inside of a host pipe.

Prior to their insertion in a host pipe, the polymer liner pipes have a larger outer diameter than the inner diameter of the host pipe into which they are being inserted. The liner pipes are temporarily reduced in diameter immediately prior to insertion, for example by pulling them through the host pipe via a reduction die. After the insertion of the liner pipe is completed, the pulling tension is released and the liner pipe is allowed to revert towards its original size so as to provide a tight fitting liner inside the host pipe.

Individual lengths of polymer lined pipes have been joined together to create products such as such as carbon steel flowline for high pressure operation and transport of corrosive products. This is achieved by welding using connectors comprising carbon steel pipe internally clad with corrosion resistant alloy (CRA) or are made entirely from CRA.

For example, US publication number US 2010/0207380 describes a welded joint of a lined pipeline which has a main pipe and an extension piece having a generally tubular shape, an inner wall and an annular weld connecting the extension piece to the main pipe. A liner extends through the main pipe and partially into the extension piece. A compression ring engages the liner internally and compresses the liner radially outwardly against the extension piece so that the liner is sealed with the compression ring. The extension pieces on respective lined pipelines may then be welded together.

Similarly, the method of joining sections of lined pipe disclosed in U.S. Pat. No. 5,992,897 requires that a tubular metal fitting clad internally with CRA is joined to an end of each pipe, wherein each fitting has a free end to be welded to a respective free end of the other. Likewise, a ring of corrosion resistant metal is inserted into the liner in each fitting to compress the liner and force it into grooves provided in each fitting, after which the fittings themselves, rather than the pipes, are joined together.

International publication number WO95/22713 also discloses a method of joining two lengths of lined pipe in which pup pieces clad internally with CRA are welded to the ends of respective lined pipes. The provision of the pup pieces, and in this case of moulded hubs with CRA inserts which are provided on the ends of the liners, serve to distance the ends of the liners from the weld which is carried out between respective pup pieces.

In each of these examples, the extension pieces and not the lined pipes themselves are welded together. This is to prevent the heat from the welding process from damaging or otherwise affecting the polymer liner. In WO95/22713, further protection is provided by the application of hubs to the ends of the liners themselves. While such connectors are expensive and the process of joining lined pipes in this way time consuming, in applications where the polymer lined pipes are long, say up to 1.5 km, procuring and fitting such connectors can be commercially viable.

However, when the individual polymer lined strings are at much shorter lengths, say 12 m to 24 m (or even 48 m) the cost of procuring and fitting such connectors is prohibitively expensive and time consuming. Accordingly, polymer lining technology has to date been prevented from making the transition from long lengths used in subsea reeling or bundles to subsea installation from s-lay or j-lay vessels where flowlines are assembled by fabricating single (12 m) or double (24 m) joints offshore.

S-lay and j-lay vessels generally make use of automatic welding systems referred to as "bug and band" systems which entail fastening a "band" around the outside of the host pipe at a predetermined length from the weld fit up and the welding "bug" drives itself around the band to make a girth weld.

Similarly, external corrosion protection around the area where the weld is completed is provided via Fusion Bonded Epoxy (FBE), which entails the heating of the external surface of the pipe in the zone where the weld is made to around 238° C. This also presents a risk of thermal damage to a liner inside the pipe in this area.

To join adjacent lined pipe lengths, it is known to provide an electrofusion fitting to connect the inner pipe linings prior to welding the metal pipe lengths together. The Applicant's earlier International Application Publication Number WO 2010/041016 discloses an electrofusion fitting and a method of forming a pipe joint between two lined metal pipe lengths incorporating such a fitting. The electrofusion fitting is a sleeve largely comprised of a thermoplastic material and includes heating coils disposed at either end of the fitting. In use, the lining is stripped back and the electrofusion fitting inserted into the end of a lined metal pipe length. The heating coils are then provided with electrical power which causes the fitting and the lining in the vicinity of the coils to melt and fuse together. The process is repeated to fuse the fitting to the lining of the other metal pipe length, after which the metal pipe lengths themselves are welded together.

The Applicant's LinerBridge® connector thus enables lined pipelines to be fully welded without the need for CRA based connectors or flanges. The LinerBridge® connector changes the economic landscape and makes it practical to produce polymer lined flowlines from s-lay or j-lay vessels. However, the temperature of the welding operation and the FBE coating which produces the girth weld and prevents it corroding may present a risk to the lined pipeline because of the proximity of the girth weld to the ends of the polymer liner.

While active cooling systems which employ cooling jackets wrapped around the host pipe in the proximity of the girth weld have been successfully used in manual tie in welding operations for reeling and bundles for many years, such methods are not considered practical or suitable for use with polymer lined flowlines welded and coated using automatic bug and band systems and corrosion coated using FBE, and by extension operations in which electrofusion fittings are used to join lined pipe lengths. As a result, automatic welding and FBE over polymer lined flowlines has not been employed to date.

Accordingly, it is an object of at least one aspect of the present invention to protect lined pipeline from the heat generated when the ends of lined pipe sections are welded together and/or coated. Embodiments of aspects of the present invention enable the ends of lined pipe sections to be welded together without requiring the use of extension pieces, and obviate or mitigate one or more further disadvantages of existing arrangements and methods.

Further aims and objects of aspects and embodiments of the invention will become apparent from reading the following description.

SUMMARY OF THE INVENTION

According to a first aspect of the invention, there is provided a method of joining two sections of lined pipe, the method comprising providing each section of lined pipe with an insulatory sleeve between the pipe lining and the host pipe, and subsequently welding the ends of the host pipes of the two sections of lined pipe together.

A lined pipe comprises a host pipe and a liner; there is a potential risk of heat damage to the ends of a liner when sections of lined pipe are welded together and/or FBE coated which is reduced or removed by providing an insulatory sleeve between the host pipe and liner.

Preferably, an insulatory sleeve is provided in a section of lined pipe by locating the insulatory sleeve in an end of the host pipe, temporarily reducing the diameter of the lining and drawing it through the host pipe and the insulatory sleeve, and allowing the lining to revert to form a tight fit against internal surfaces of the host pipe and insulatory sleeve.

Providing the insulatory sleeve in the section of lined pipe may be performed onshore, and welding the ends of the host pipes together may be performed offshore.

Optionally, the insulatory sleeve comprises an aerogel material, which may be a silica aerogel. The insulatory sleeve may be formed from or otherwise comprise an aerogel blanket.

Alternatively, or additionally, the insulatory sleeve may comprise a polyurethane foam, which may be compressible. The insulatory sleeve may of course comprise or further comprise any suitable insulating material. Such material may be selected from the group comprising; syntactic foam, solid polyurethane, polyurethane foam, solid polypropylene and polypropylene foam, mineral wool, fibreglass, microporous silica, rubber or neoprene, expanded perlite, filament reinforced pyrogenic silica or alumina (with or without a mica shield).

Syntactic foams are composite materials in which hollow particles such as glass microspheres are suspended in a matrix such as silicone.

Alternatively, or additionally, providing each section of lined pipe with an insulatory sleeve between the pipe lining and the host pipe comprises applying a coating onto an inner surface of the host pipe.

Optionally, the coating may comprise a plasma sprayed composite coating, or a flexible plasma sprayed ceramic heat shield.

Preferably, the insulatory sleeve is compressed between the pipe lining and the host pipe.

Most preferably, the insulatory sleeve is provided near the end of the host pipe. While the insulatory sleeve may be located at the end of the host pipe, it is preferable if it is spaced, by a relatively short distance, from the end of the host pipe.

Most preferably, the insulatory sleeve does not extend the full length of the section of lined pipe. Provision of a discrete insulatory sleeve provides thermal protection in the area where it is needed most—i.e. close to the weld and the heat produced thereby—without the expense and technical considerations required to insulate an entire lined pipe section.

Most preferably, the insulatory sleeves provided in each of the two sections of lined pipe extend beyond respective ends of the pipe linings. Accordingly, the ends of the pipe linings are protected from the potential risk of heat damage.

Preferably, the insulatory sleeve is cylindrical. Optionally, the insulatory sleeve comprises an outer and/or an inner sheath to which an insulating material is attached.

Alternatively, the insulatory sleeve is formed by wrapping an insulating material around the pipe lining, in which case the insulatory sleeve may be formed from a thermal wrap.

Preferably, the method comprises joining the pipe linings of the two sections of lined pipe together. Most preferably the pipe linings of the two sections of lined pipe are joined together using an electrofusion fitting. Most preferably, the insulatory sleeves provided in each of the two sections of lined pipe extend beyond respective ends of the electrofusion fitting.

In this way, in addition to protecting the ends of the pipe linings from the potential risk of heat damage, the welds produced between the electrofusion fitting and the pipe linings are also protected from the potential risk of heat damage.

Optionally, the method further comprises applying a field joint coating in the region of the weld between the ends of the host pipe. Preferably, the field joint coating is applied to the bare steel of the host pipes between corresponding parent coatings.

Similarly, in addition to protecting the ends of the pipe linings and/or the electrofusion welds from the potential risk of heat damage when the ends of the host pipes are welded together, they are protected from the potential risk of heat damage when the field joint coating is applied.

Optionally, the ends of the host pipes of the two sections of lined pipe are welded together using automatic welding apparatus, which may comprise a bug and band system.

Optionally, the method may comprise applying one or more cooling jackets to an external surface of the host pipe.

According to a second aspect of the invention, there is provided a section of lined pipe comprising a host pipe and a pipe lining, and an insulatory sleeve located at or near an end of the host pipe and between the host pipe and the pipe lining.

Preferably, the insulatory sleeve is held in compression between the host pipe and the pipe lining. Optionally, the insulatory sleeve comprises an aerogel material, which may be a silica aerogel. Optionally, the insulatory sleeve comprises an outer and/or an inner sheath to which the aerogel or other suitable insulator material is attached. Alternatively, or additionally, the insulator sleeve may comprise an aerogel blanket.

The insulatory sleeve may of course comprise or further comprise any suitable insulating material. Such material may be selected from the group comprising; syntactic foam, solid polyurethane, polyurethane foam, solid polypropylene and polypropylene foam, mineral wool, fibreglass, microporous silica, rubber or neoprene, expanded perlite, filament reinforced pyrogenic silica or alumina (with or without a mica shield).

Alternatively, or additionally, providing each section of lined pipe with an insulatory sleeve between the pipe lining and the host pipe comprises applying a coating onto an inner surface of the host pipe. Optionally, the coating may comprise a plasma sprayed composite coating, or a flexible plasma sprayed ceramic heat shield.

Preferably, the insulatory sleeve extends beyond an end of the pipe lining. Preferably, the insulatory sleeve does not extend beyond a corresponding end of the host pipe. Alternatively, the insulatory sleeve does not extend beyond an end of the pipe lining.

Preferably, the host pipe comprises carbon steel. Preferably, the pipe lining comprises a thermoplastic polymer. Optionally, the pipe lining comprises a recess adapted, arranged or configured to receive an electrofusion fitting.

Embodiments of the second aspect of the invention may comprise features corresponding to any essential, preferred or optional features of any other aspect of the invention or vice versa.

According to a third aspect of the invention, there is provided a method of laying pipeline on a seabed, the method comprising providing at least a first and a second section of lined pipe according to the second aspect, joining the lining of the first lined pipe section to the lining of the second lined pipe section, joining the host pipe of the first lined pipe section to the host pipe of the second lined pipe section, and lowering the joined sections of lined pipe to the seabed.

Preferably, the lining of the first lined pipe section is joined to the lining of the second lined pipe section using an electrofusion fitting.

Preferably, the host pipe of the first lined pipe section is joined to the host pipe of the second lined pipe section using an automatic welding apparatus, which may be a bug and band system.

Preferably, the method is performed on an s-lay or a j-lay vessel. Alternatively, the method may apply to any application where automatic welding or manual welding and/or FBE application is to be made to a polymer lined pipeline.

Optionally, the method further comprises applying a field joint coating to the joined sections of lined pipe.

Optionally, the method comprises lowering the joined sections of lined pipe to the seabed while keeping a lower end of the joined pipe sections closed, and subsequently opening the lower end of the joined pipe sections to allow seawater to flood the joined pipe sections.

Embodiments of the third aspect of the invention may comprise features corresponding to any essential, preferred or optional features of any other aspect of the invention or vice versa.

According to a fourth aspect of the present invention there is provided an insulatory sleeve adapted, arranged or configured to be located at or near an end of a host pipe and between the host pipe and a pipe lining of a section of lined pipe.

Optionally, the insulatory sleeve comprises an aerogel material, which may be a silica aerogel. Optionally, the insulatory sleeve comprises an outer and/or an inner sheath to which the aerogel or other insulator material is attached. The insulatory sleeve may of course comprise or further comprise any suitable insulating material. Such material may be selected from the group comprising; syntactic foam, solid polyurethane, polyurethane foam, solid polypropylene and polypropylene foam, mineral wool, fibreglass, microporous silica, rubber or neoprene, expanded perlite, filament reinforced pyrogenic silica or alumina (with or without a mica shield).

Alternatively, or additionally, providing each section of lined pipe with an insulatory sleeve between the pipe lining and the host pipe comprises applying a coating onto an inner surface of the host pipe. Optionally, the coating may comprise a plasma sprayed composite coating, or a flexible plasma sprayed ceramic heat shield.

Preferably, the insulatory sleeve is cylindrical. Preferably, the insulatory sleeve is of a length selected to extend beyond an end of the pipe lining. Preferably, the insulatory sleeve is of a length selected to terminate before a corresponding end of the host pipe. Alternatively, the insulatory sleeve is of a length which does not extend beyond an end of the pipe lining.

Embodiments of the fourth aspect of the invention may comprise features corresponding to any essential, preferred or optional features of any other aspect of the invention or vice versa.

According to further aspects of the invention, there may be provided a lined pipe section, a method of joining two lined pipe sections, a method of field joint coating, a lined pipeline, an insulatory sleeve, and a method of laying lined pipeline, each substantially as herein described with reference to the appended drawing.

BRIEF DESCRIPTION OF THE DRAWINGS

Aspects and advantages of the present invention will become apparent upon reading the following detailed description and upon reference to the following drawings (like reference numerals referring to like features) in which.

DETAILED DESCRIPTION OF PREFERRED EMBODIMENTS

As discussed in the background to the invention above, automatic welding over polymer lined flowlines has not been employed to date at least partly due to concerns regarding potential damage to the polymer liners. An embodiment of an aspect of the present invention is now described with reference to FIGS. 1 and 2 which reduces the risk of damage to the polymer liners from the heat generated when the ends of line pipe sections are welded together. This is achieved without requiring the use of extension pieces, and enables electrofusion fittings, such as the Applicant's LinerBridge® fitting (in which the end of the polymer liner can be closer to the end of the pipe than in prior arrangements) to be deployed with improved confidence in s-lay and j-lay operations.

Figure 1:
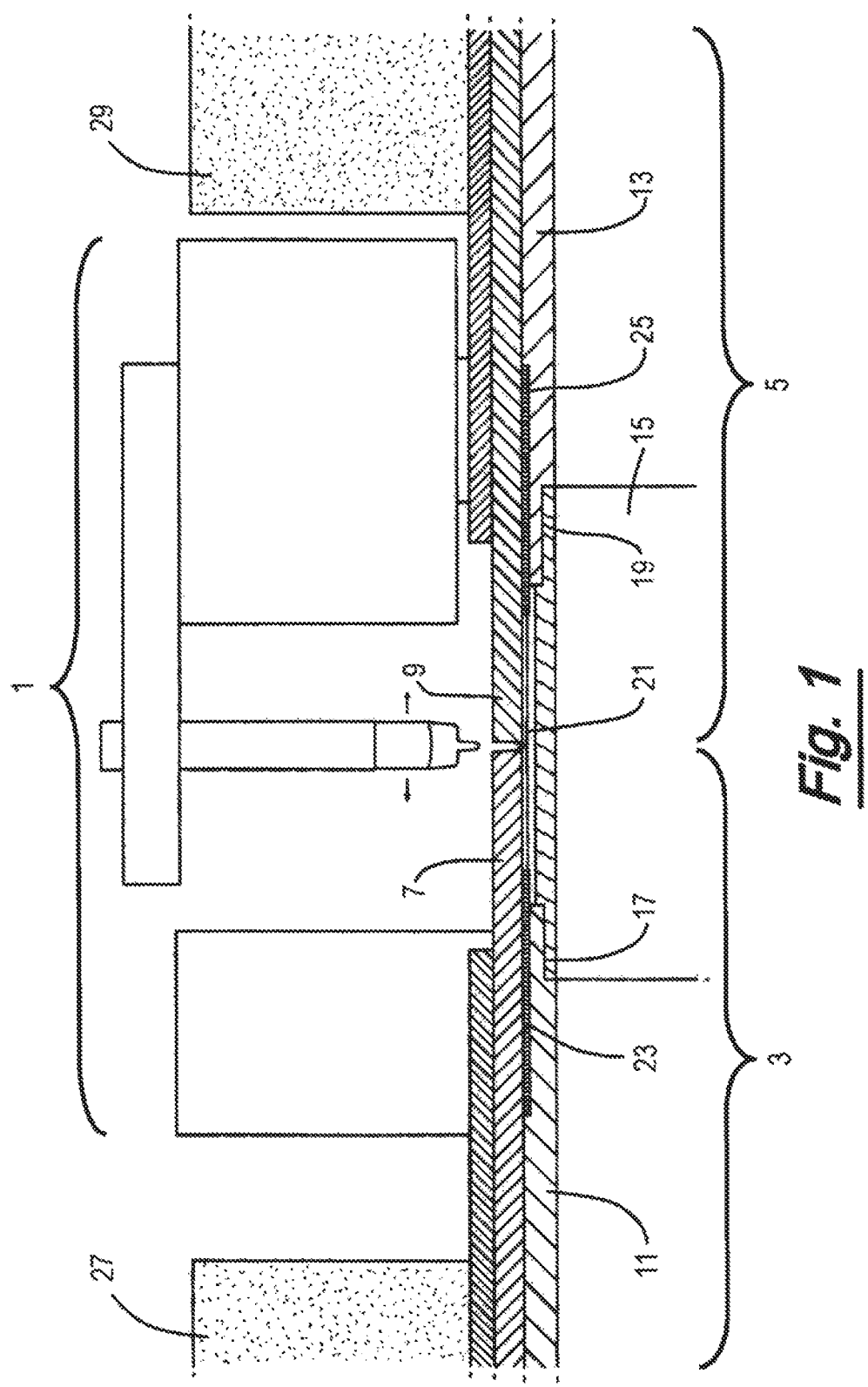
FIG. 1 illustrates a partial longitudinal cross-sectional view of the end portions of two polymer lined pipes immediately prior to being welded together in accordance with the present invention.

FIG. 1 illustrates a pipe welding process about to commence in which a bug and band type automatic welding tool 1 will perform a girth weld between the end of a first lined pipe section 3 and a second lined pipe section 5. The first 3 and second 5 lined pipe sections each comprise a carbon steel pipe 7,9 and a polymer liner 11,13 in tight engagement with respective inner surfaces of the carbon steel pipe 7,9.

Each liner 11,13 comprises a recess 17,19 which receives a respective end of an electrofusion fitting 15. The electrofusion fitting 15 is of a same or similar polymer to the liners 11,13 and is welded to the liners 11,13 by way of heating coils (not shown) disposed on an outer surface of the fitting 15 which is in contact with the liners 11,13. In this way, continuity along an inner bore of the pipeline thus created is preserved.

Disposed on an outer surface 21 of the fitting 15 is a layer of ceramic welding tape to protect the thermal insulation which prevents heat from the subsequent girth welding process from damaging the electrofusion fitting 15.

It will however be understood that heat from the girth welding process will be conducted along the carbon steel pipes 7,9 and accordingly to the corresponding liners 11,13. In addition to the potential risk of thermal damage to the liners 11,13, there is additional potential risk of thermal damage to the interfaces between the fitting 15 and the liners 11,13 (i.e. in the regions indicated by reference numerals 17,19 which refer to the recesses in which the fitting 15 is received).

As described above, in conventional pipe welding operations and arrangements cooling jackets may be wrapped around the carbon steel pipes to draw heat away and keep the carbon steel pipes relatively cool. Such cooling jackets serve at least to prevent conduction of heat along the carbon steel pipes. However, in arrangements such as shown in FIG. 1, particularly where there are significant space restraints due to the shortened distance between the weld region and the end of the liners, cooling jackets cannot be accommodated. In addition, this shortened distance increases the potential risk of heat damage which makes an alternative solution incredibly desirable.

So in accordance with the invention, and in order to reduce or remove the potential risk of heat damage in the absence of cooling jackets, each lined pipe section 3,5 is provided with a cylindrical insulatory sleeve 23,25 which is disposed between the carbon steel pipe 7,9 and the respective liner 11,13. The sleeves 23,25 do not extend the full length of the lined pipe sections 3,5; rather they provide discrete thermal protection to the ends of the liners 11,13 and the electrofusion welds between the fitting 15 and the liners 11,13.

Although the sleeves 23,25 do not extend the full length of the liner pipe sections 3,5 they do extend beyond the recesses 17,19 (and hence the electrofusion welds) so as to reduce or remove the potential risk of heat transfer to the electrofusion welds from heat which might otherwise be conducted through the carbon steel pipe 7,9 from regions beyond the end of the sleeves 23,15. The sleeves 23,25 as shown also extend beyond the ends of the liners 11,13 to protect the ends of the liners 11,13 from the potential risk of heat damage.

Figure 2:
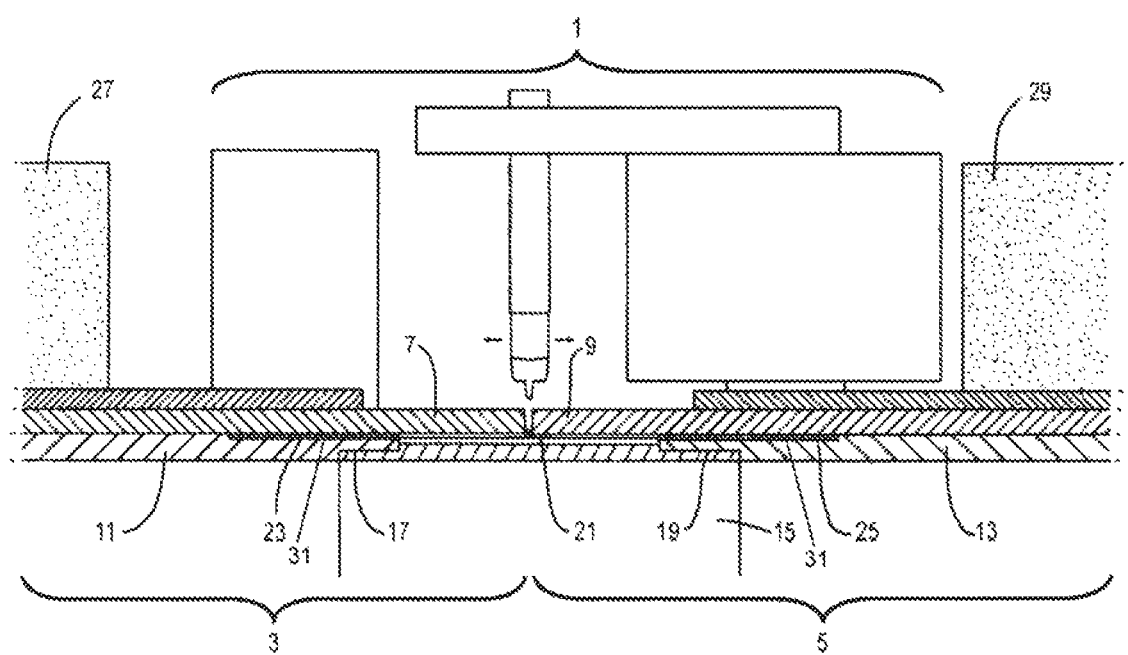
FIG. 2 shows a variation of the arrangement shown in FIG. 1.

As shown in FIG. 2, the ends of the sleeves 23,25 could of course coincide with the ends of the liners 11,13. It is noted that the arrangement shown in FIG. 2 is otherwise the same as the arrangement shown in FIG. 1. In a further alternative, the ends of the sleeves 23,25 could even be behind the ends of the liners 11,13 so that they are sealed between the liners 11,13 and the carbon steel pipes 7,9.

In this particular embodiment, the insulatory sleeves 23,25 are comprised of an aerogel material such as Pyrogel®. The Applicant has made the surprising discovery that the thermal insulation provided by an aerogel material is enhanced when the insulatory sleeves 23,25 are compressed. However, it will be understood that any suitable insulator material may be used, for example compressible polyurethane foam. Other suitable materials may include syntactic foam, solid polyurethane, polyurethane foam, solid polypropylene and polypropylene foam, mineral wool, fibreglass, micro-porous silica, rubber or neoprene, and expanded perlite, or filament reinforced pyrogenic silica or alumina (with or without a mica shield) such as Promaguard®.

In accordance with an embodiment of a complementary aspect of the present invention, the insulatory sleeves 23,25 are disposed between the carbon steel pipes 7,9 and respective liners 11,13 when the liners 11,13 are inserted into the carbon steel pipes 7,9. In a preferred embodiment, the insulatory sleeves 23,25 are first located in the ends of the carbon steel pipes 7,9, then the carbon steel pipes 7,9 are lined by drawing the liners 11,13 through the carbon steel pipes 7,9 via a reduction die to reduce their external diameter. When pulling tension on the liners 11,13 is removed, the liners 11,13 revert towards their original dimensions resulting in a tight fitting against the internal surface of the carbon steel pipes 7,9. However, as the insulatory sleeves 23,25 are located in the ends of the carbon steel pipes 7,9 the liners form a tight fit against the internal surface of the insulatory sleeves 23,25 near the ends of the carbon steel pipes.

As described above, the thermal insulation provided by the aerogel material is enhanced when the insulatory sleeves 23,25 are compressed. The reversion process which produces a tight fit against the internal surfaces of the carbon steel pipes 7,9 and the insulatory sleeves 23,25 therefore also serves to increase the effectiveness of the insulatory sleeves 23,25 themselves. Accordingly, the insulatory sleeves are not only held in the desired location but they work better as a result.

Note that the insulatory sleeves 23,25 may comprise an outer and/or an inner sheath 31 to which the aerogel (or other insulator) material is attached. This assists in handling and application to the carbon steel pipes 7,9 and/or the liners 11,13 respectively.

In addition to the potential risk of heat damage during the welding process, there are additional risks of heat damage in other operations in which the present invention also finds utility.

Typically, offshore pipelines are coated with a robust anticorrosive coating such as fusion bonded epoxy or a multilayer polyolefin system. Such a coating is indicated by reference numerals 27,29. To enable the pipe sections 3,5 to be welded together (for example on an s-lay or j-lay vessel—see below) the coating must stop short of the ends of the pipe sections 3,5 to expose the carbon steel pipes 7,9. Accordingly, after the pipe sections 3,5 are welded together there is a need to apply a coating around the so-called field joint to protect the field joint from corrosion. These coatings are commonly called field joint coatings.

Field joint coating typically requires heating of the field joint region before and during application of the field joint coating. However, when the pipe sections 3,5 comprise liners 11,13, there is a potential risk of heat damage to the liners 11,13 and to the electrofusion fitting 15 and respective welds therebetween when the field joint region is heated. Accordingly, the insulatory sleeves 23,25 of the present invention provide additional utility in protecting the liners 11,13, the electrofusion fitting 15 and said welds during field joint coating.

Note that although the invention is described above in the context of an absence of cooling jackets due to the particular arrangement shown and the space restraints which prevent cooling jackets from being employed, it is foreseen that cooling jackets could still be employed in addition to the insulatory sleeves either in an alternative arrangement in which such space restraints are not present or if suitably shaped and sized cooling jackets were provided or developed.

The aerogel material from which the insulatory sleeves may be formed may comprise a silica aerogel, or indeed any other aerogel. Furthermore, while the insulatory sleeves are described as comprising an aerogel material (which provides particular and additional advantages as detailed above) the insulatory sleeves may of course comprise any suitable material which provides thermal insulation between a host pipe and a liner disposed in the host pipe. For example, a compressible polyurethane foam. The insulatory sleeves may for example comprise layers of different materials. Other suitable materials may include syntactic foam, solid polyurethane, polyurethane foam, solid polypropylene and polypropylene foam, mineral wool, fibreglass, micro-porous silica, rubber or neoprene, and expanded perlite, filament reinforced pyrogenic silica or alumina (with or without a mica shield).

It will also be understood that providing each section of lined pipe with an insulatory sleeve between the pipe lining and the host pipe may be achieved, at least in part, by applying a coating onto an inner surface of the host pipe. For example, the coating may comprise a plasma sprayed composite coating such as Zircotec®, or a flexible plasma sprayed ceramic heat shield such as Zircoflex®.

It should also be noted that the insulatory sleeves need not be cylindrical or continuous, and may be provided by wrapping an insulating material around the liner before, as, or after it is drawn through the host pipe. Importantly, the insulating material is retained and compressed between the liner and the host pipe section and is discrete rather than extending the full length of the host pipe section.

In a pipelay operation, in which a polymer lined pipeline is to be laid on the seabed by an s-lay or j-lay vessel, a pipeline can be constructed length-by-length in which case adjacent sections of pipe are welded on board (as contrasted with a reel-lay method in which case a continuous length of pipe is deployed from a reel). Lined pipeline of indefinite length can be constructed firstly by joining the liner of one pipe section to the liner of a subsequent pipe section using electrofusion fittings then welding the ends of pipe sections together as described above. In each weld, the provision of insulatory sleeves at each end of the lined pipe sections protects the electrofusion welds and the ends of the liners from the potential risk of heat damage.

It should also be noted that the provision of insulatory sleeves of the type and in the manner described herein preserves the continuity of the annulus between the host pipe and the polymer liner.

It is also foreseen that the insulatory sleeves of the present invention may find utility in loose-fitting liner applications. In such applications, the insulatory sleeves may be of a thickness greater than or commensurate with the size of the annulus between the host pipe and the polymer liner. The insulatory sleeves may therefore provide for a push fit into the host pipe and provide for subsequent push fitting of the polymer liner through the sleeve, or the insulatory sleeves may provide for a push fit between the host pipe and polymer liner which is already in situ. This may assist in holding the insulatory sleeves in place as well as in compression if it is advantageous to do so (e.g. for aerogel materials). Of course an insulatory sleeve may be of a thickness less than the size of the annulus and therefore be able to slip into the space between the host pipe and the polymer liner.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

For example, where pipe lining methods have been exemplified with reference to the Applicant's Swagelining® pipe lining service, it will be understood that the methods apply equally to pipelines lined using sliplining, folded liner insertion or other similar techniques as well as loose-fitting lining techniques as discussed above. Likewise, references to the Applicant's LinerBridge® electrofusion fitting will be understood to apply equally to other electrofusion fittings or equivalent arrangements.

The invention claimed is:

1. A method of joining two sections of lined pipe, each section of lined pipe comprising a pipe lining within a host pipe, the method comprising providing each section of lined pipe with a respective insulatory sleeve between the respective pipe lining and the respective host pipe, and subsequently welding an end of the host pipe of one of the sections of lined pipe to an end of the host pipe of the other section of lined pipe;
    wherein, for each section of lined pipe, the respective insulatory sleeve is provided in the section of lined pipe onshore, by;
    locating the insulatory sleeve in the respective host pipe so that the insulatory sleeve is spaced axially inwardly from each end of the host pipe;
    temporarily reducing the diameter of the respective pipe lining and drawing it through the host pipe and the insulatory sleeve; and
    allowing the pipe lining to revert to engage internal surfaces of the host pipe and insulatory sleeve;
    wherein each insulatory sleeve extends beyond the end of the respective pipe lining and does not extend the hill length of the respective section of lined pipe;
    and wherein the respective ends of the respective host pipes are welded together offshore.

2. The method of claim 1, wherein each insulatory sleeve comprises ara aerogel material.

3. The method of claim 1, wherein each insulatory sleeve comprises a compressible polyurethane foam.

4. The method of claim 1, wherein each insulatory sleeve comprises syntactic foam, solid polyurethane, polyurethane foam, solid polypropylene and polypropylene foam, mineral wool, fibreglass, micro-porous silica, rubber, neoprene, expanded perlite, filament reinforced pyrogenic silica or alumina with or without a mica shield.

5. The method of claim 1, wherein providing each section of lined pipe with an insulatory sleeve between the pipe lining and the host pipe comprises applying a coating onto an inner surface of the host pipe.

6. The method of claim 5, wherein the coating comprises a plasma sprayed composite coating, or a flexible plasma sprayed ceramic heat shield.

7. The method of claim 1, wherein each insulatory sleeve is compressed between the respective pipe lining and the respective host pipe.

8. The method of claim 1, wherein each insulator sleeve is provided near the end of the respective host pipe.

9. The method of claim 1, wherein each insulatory sleeve is cylindrical.

10. The method of claim 1, wherein each insulatory sleeve comprises an outer and/or an inner sheath to which an insulating material is attached.

11. The method of claim 1, further comprising joining the pipe linings of the two sections of lined pipe together.

12. The method of claim 11, wherein the pipe linings of the two sections of lined pipe are joined together using an electrofusion fitting.

13. The method of claim 12, wherein the insulatory sleeves provided in each of the two sections of lined pipe extend beyond respective ends of the electrofusion fitting.

14. The method of claim 1, wherein the ends of the host pipes of the two sections of lined pipe are welded together using an automatic welding apparatus.

15. The method of claim 14, wherein the automatic welding apparatus comprises a bug and band system.

16. A section of lined pipe comprising:
a host pipe;
a pipe lining within the host pipe; and
an insulatory sleeve located between the host pipe and the pipe lining, the insulatory sleeve being spaced axially inwardly from each end of the host pipe, wherein the pipe lining engages internal surfaces of the insulatory sleeve and the host pipe and the insulatory sleeve is held in compression between the host pipe and the pipe lining, aid wherein the insulator) sleeve extends beyond the end of the pipe lining and does not extend the full length of the section of lined pipe.

17. The section of lined pipe of claim 16, wherein the insulatory sleeve comprises an aerogel material.

18. The section of lined pipe of claim 16, wherein the insulatory sleeve comprises syntactic foam, solid polyurethane, polyurethane foam, solid polypropylene and polypropylene foam, mineral wool, fibreglass, micro-porous silica, rubber, neoprene, expanded perlite, filament reinforced pyrogenic silica or alumina (with or without a mica shield), a plasma sprayed composite coating, or a flexible plasma sprayed ceramic heat shield.

19. The section of lined pipe of claim 16, wherein the insulatory sleeve comprises an outer and/or an inner sheath to which aerogel or other insulator material is attached.

20. The section of lined pipe of claim 16, wherein the insulatory sleeve does not extend beyond an end of the pipe lining.

21. The section of lined pipe of claim 16, wherein the host pipe comprises carbon steel.

22. The section of lined pipe of claim 16, wherein the pipe lining comprises a thermoplastic polymer.

23. The section of lined pipe of claim 16, wherein the pipe lining comprises a recess adapted, arranged or configured to receive an electrofusion fitting.

24. A method of laying pipeline on a seabed, the method comprising:
providing at least a first and a second section of lined pipe, each of the first and second lined pipe sections comprising a host pipe and a pipe lining within the host pipe, and an, insulatory sleeve located between the host pipe and the pipe lining, wherein, for each pipe section, the pipe lining engages internal surfaces of the insulatory sleeve and the host pipe and the insulatory sleeve is held in compression between the host pipe and the pipe lining, and wherein the insulatory sleeve extends beyond the end of the pipe lining, is spaced axially inwardly from each end of the host pipe, and does not extend the full length of the section of lined pipe;
joining the lining of the first lined pipe section to the lining of the second lined pipe section;
joining the host pipe of the first lined pipe section to the host pipe of the second lined pipe section; and
lowering the joined sections of lined pipe to the seabed.

25. The method of claim 24, wherein the lining of the first lined pipe section is joined to the lining of the second lined pipe section using an electrofusion fitting.

26. The method of claim 24, wherein the host pipe of the first lined pipe section is joined to the host pipe of the second lined pipe section using an automatic welding apparatus.

27. The method of claim 24, wherein the method comprises lowering the joined sections of lined pipe to the seabed while keeping a lower end of the joined pipe sections closed, and subsequently opening the lower end of the joined pipe sections to allow seawater to flood the joined pipe sections.

* * * * *

UNITED STATES PATENT AND TRADEMARK OFFICE
CERTIFICATE OF CORRECTION

PATENT NO. : 11,047,513 B2
APPLICATION NO. : 15/575812
DATED : June 29, 2021
INVENTOR(S) : Stephen Barnes It is certified that error appears in the above-identified patent and that said Letters Patent is hereby corrected as shown below:

In the Claims

Column 10, Line 17, in Claim 1, cancel the text beginning with "1. A method of joining two sections of lined pipe," to and ending "pipes are welded together offshore." in Column 10, Line 40, and insert the following claim:

--1. A method of joining two sections of lined pipe, each section of lined pipe comprising a pipe lining within a host pipe, the method comprising providing each section of lined pipe with a respective insulatory sleeve between the respective pipe lining and the respective host pipe, and subsequently welding an end of the host pipe of one of the sections of lined pipe to an end of the host pipe of the other section of lined pipe;

wherein, for each section of lined pipe, the respective insulatory sleeve is provided in the section of lined pipe onshore, by;

locating the insulatory sleeve in the respective host pipe so that the insulatory sleeve is spaced axially inwardly from each end of the host pipe;

temporarily reducing the diameter of the respective pipe lining and drawing it through the host pipe and the insulatory sleeve; and allowing the pipe lining to revert to engage internal surfaces of the host pipe and insulatory sleeve;

wherein each insulatory sleeve extends beyond the end of the respective pipe lining and does not extend the full length of the respective section of lined pipe;

and wherein the respective ends of the respective host pipes are welded together offshore.--

Signed and Sealed this
Twenty-second Day of August, 2023

*Katherine Kelly Vidal*
Katherine Kelly Vidal
*Director of the United States Patent and Trademark Office*